United States Patent
Yoshioka et al.

(10) Patent No.: US 7,777,764 B2
(45) Date of Patent: Aug. 17, 2010

(54) PORTABLE DISPLAY DEVICE

(75) Inventors: Shoji Yoshioka, Kashihara (JP); Masaharu Itado, Nara (JP); Yusuke Nishi, Tenri (JP); Tatsuya Oikawa, Chiba (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1065 days.

(21) Appl. No.: 10/571,137

(22) PCT Filed: Sep. 9, 2004

(86) PCT No.: PCT/JP2004/013100

§ 371 (c)(1),
(2), (4) Date: Mar. 9, 2006

(87) PCT Pub. No.: WO2005/027089

PCT Pub. Date: Mar. 24, 2005

(65) Prior Publication Data

US 2007/0097103 A1 May 3, 2007

(30) Foreign Application Priority Data

Sep. 11, 2003 (JP) ............................. 2003-319826

(51) Int. Cl.
*G09G 5/00* (2006.01)
(52) U.S. Cl. ...................... 345/659; 345/649; 345/619
(58) Field of Classification Search ................ 345/418, 345/619, 649, 656, 659, 684, 688; 715/784–787; 455/1–575.9
See application file for complete search history.

(56) References Cited

U.S. PATENT DOCUMENTS

| | | | | |
|---|---|---|---|---|
| 5,315,377 A * | 5/1994 | Isono et al. | ................... | 348/51 |
| 5,717,415 A * | 2/1998 | Iue et al. | ................... | 345/8 |
| 6,049,424 A * | 4/2000 | Hamagishi | ................... | 359/464 |
| 6,061,084 A * | 5/2000 | Perlin | ................... | 348/51 |
| 6,108,029 A * | 8/2000 | Lo | ................... | 348/43 |
| 6,239,787 B1 * | 5/2001 | Sugaya | ................... | 345/169 |
| 6,437,915 B2 * | 8/2002 | Moseley et al. | ................... | 359/465 |
| 6,496,598 B1 * | 12/2002 | Harman | ................... | 382/154 |
| 6,765,568 B2 * | 7/2004 | Swift et al. | ................... | 345/419 |
| 7,446,733 B1 * | 11/2008 | Hirimai | ................... | 345/32 |
| 2004/0027793 A1* | 2/2004 | Haraguchi et al. | ................... | 361/683 |

(Continued)

FOREIGN PATENT DOCUMENTS

JP  6-337656 A  12/1994

(Continued)

*Primary Examiner*—Xiao M Wu
*Assistant Examiner*—Abderrahim Merouan
(74) *Attorney, Agent, or Firm*—Birch, Stewart, Kolasch & Birch, LLP

(57) ABSTRACT

A mobile telephone has a display section for displaying a left screen in the left direction and a right screen in the right direction. Accordingly, a viewer holding the mobile telephone in hand can view the left screen when viewing the display section from the left side and the right screen when viewing the display section from the right side. Furthermore, the mobile telephone detects a change of the direction of the display section and switches the display screen. Consequently, when the viewer returns the holding state for viewing the right screen to the previous state and views the screen from the left side, he/she can view the next left screen.

11 Claims, 13 Drawing Sheets

U.S. PATENT DOCUMENTS

| | | | |
|---|---|---|---|
| 2004/0075973 A1* | 4/2004 | Makela | 361/683 |
| 2004/0240777 A1* | 12/2004 | Woodgate et al. | 385/16 |
| 2007/0296874 A1* | 12/2007 | Yoshimoto et al. | 348/739 |

FOREIGN PATENT DOCUMENTS

| | | |
|---|---|---|
| JP | 10-301750 A | 11/1998 |
| JP | 2000-206483 A | 7/2000 |
| JP | 2001-175609 A | 6/2001 |
| JP | 2001-237933 A | 8/2001 |
| JP | 2001-257750 A | 9/2001 |
| JP | 2002-101172 A | 4/2002 |
| JP | 2003-5735 A | 1/2003 |
| JP | 2003-84701 A | 3/2003 |
| JP | 2003-216300 A | 7/2003 |

* cited by examiner

PORTABLE DISPLAY DEVICE

TECHNICAL FIELD

The present invention relates to a portable display device, and more particularly to a portable display device capable of displaying a large amount of information in an easily viewable manner.

BACKGROUND ART

Information instruments including a liquid crystal display device such as a portable phone have increasingly been reduced in size. Therefore, a size of the liquid crystal display device that can be mounted on such an information instrument is limited.

Meanwhile, an amount of information that is desired to be displayed on the liquid crystal display has increased significantly, along with expansion of a memory capacity or widespread use of a high-speed communication function.

In a conventional information instrument, when a large amount of information is displayed on the liquid crystal display device, a scroll operation utilizing a scroll key or a scroll bar has been performed so as to forward a screen sequentially one by one.

Patent Document 1: Japanese Patent Laying-Open No. 2001-175609

Patent Document 2: Japanese Patent Laying-Open No. 2001-237933

Patent Document 3: Japanese Patent Laying-Open No. 2002-101172

Patent Document 4: Japanese Patent Laying-Open No. 2001-257750

Patent Document 5: Japanese Patent Laying-Open No. 2003-5735

DISCLOSURE OF THE INVENTION

Problems to be Solved by the Invention

On the other hand, such a scroll operation interferes viewing by a viewer of information at a natural speed, and the viewer feels uncomfortable.

When map information, image information or the like is divided and viewed by forwarding the screen sequentially one by one, it is difficult to grasp the entire image. Particularly, in many cases, a photograph image in general is longer in a horizontal direction, whereas the liquid crystal display device mounted on the portable phone is longer in a longitudinal direction. Accordingly, when a photograph image is displayed on the liquid crystal display device of the portable phone, such difficulty is prominent.

In order to overcome such a problem, Patent Documents 1 to 3 disclose a portable information terminal, a portable phone and a radio information terminal unit including a plurality of liquid crystal displays that are on foldable housings. As the portable information terminal, the portable phone and the radio information terminal unit as above include the plurality of liquid crystal displays in the folded state, reduction in size of the unit itself is limited.

Patent Document 4 discloses a portable phone including two display devices and displaying text and image separately, however, such a portable phone similarly suffers from the limited reduction in size of the unit itself.

In addition, Patent Document 5 discloses a portable instrument having a plurality of display units and permitting an operation for shifting from the display unit being used to another display unit for an operation of a function. In such a portable instrument, however, it is necessary to press a prescribed key at least for a certain period of time, and operation shift with a natural operation has been impossible.

The present invention was made in view of the above-described problems, and an object of the present invention is to provide a portable display device capable of displaying a large amount of information in a limited size in an easily viewable manner.

Means for Solving the Problems

In order to achieve the object above, according to one aspect of the present invention, a portable display device includes: a screen generation unit generating a first screen and a second screen based on data to be displayed; and a display unit simultaneously displaying screens different from each other in a plurality of display directions corresponding to a plurality of visual points with respect to an identical display screen, respectively. The display unit simultaneously displays the first screen and the second screen in at least two different display directions out of the plurality of display directions, respectively.

Preferably, the screen generation unit described above cuts out data of a prescribed size based on a possible display size of the display unit from the data to be displayed, so as to generate the first screen, and cuts out data adjacent to the first screen so as to generate the second screen.

Alternatively, the screen generation unit described above preferably cuts out data of a prescribed size based on a possible display size in each direction of the display unit from the data to be displayed, and divides the cut out data, so as to generate the first screen and the second screen.

Alternatively, the screen generation unit described above cuts out data of a prescribed size based on a possible display size of the display unit from the data to be displayed, so as to generate the first screen, and generates a screen corresponding to the first screen as the second screen.

Preferably, the portable display device further includes a detection unit detecting a display switching operation while the screen of the data to be displayed is displayed on the display unit, and a screen switching unit changing at least one of the screens simultaneously displayed in the different directions, in response to the detected display switching operation.

Preferably, the display unit displays the first screen and the second screen in the different directions respectively and displays a third screen in all directions simultaneously with the first screen and the second screen.

Further preferably, the display unit displays notification of a current display mode of the display unit in the third screen.

Preferably, the display unit displays the first screen substantially in a front direction from the display unit.

Preferably, the portable display device further includes a first display mode switching unit switching a display mode on the display unit between a multi-view mode in which the first screen and the second screen are displayed in the different directions respectively and a single-view mode in which one screen is displayed in all directions in an entire display area.

Preferably, the first display mode switching unit switches the display mode on the display unit in accordance with any one of an attribute of the data to be displayed and an application for displaying the data to be displayed.

Preferably, the portable display device further includes a second display mode switching unit switching a display mode on the display unit between a multi-view mode in which the first screen and the second screen are displayed in the different directions respectively and a stereoscopic display mode.

According to another aspect of the present invention, a portable display device includes: a display unit displaying a screen of data to be displayed; a detection unit detecting a display switching operation while the screen of the data to be displayed is displayed on the display unit; and a screen switching unit switching between the screens displayed on the display unit, in response to the detected display switching operation.

Preferably, the detection unit described above detects the display switching operation by sensing change in an angle of the display unit while the screen of the data to be displayed is displayed on the display unit.

According to yet another aspect of the present invention, a portable display device includes a display unit simultaneously displaying screen data different from each other in a plurality of different display directions. The display unit simultaneously displays first screen data and second screen data in a first display area in at least two different display directions out of the plurality of display directions respectively, and displays one piece of screen data in a second display area different from the first display area such that the screen data can visually be recognized from all directions.

DESCRIPTION OF THE REFERENCE SIGNS

Figure 1:
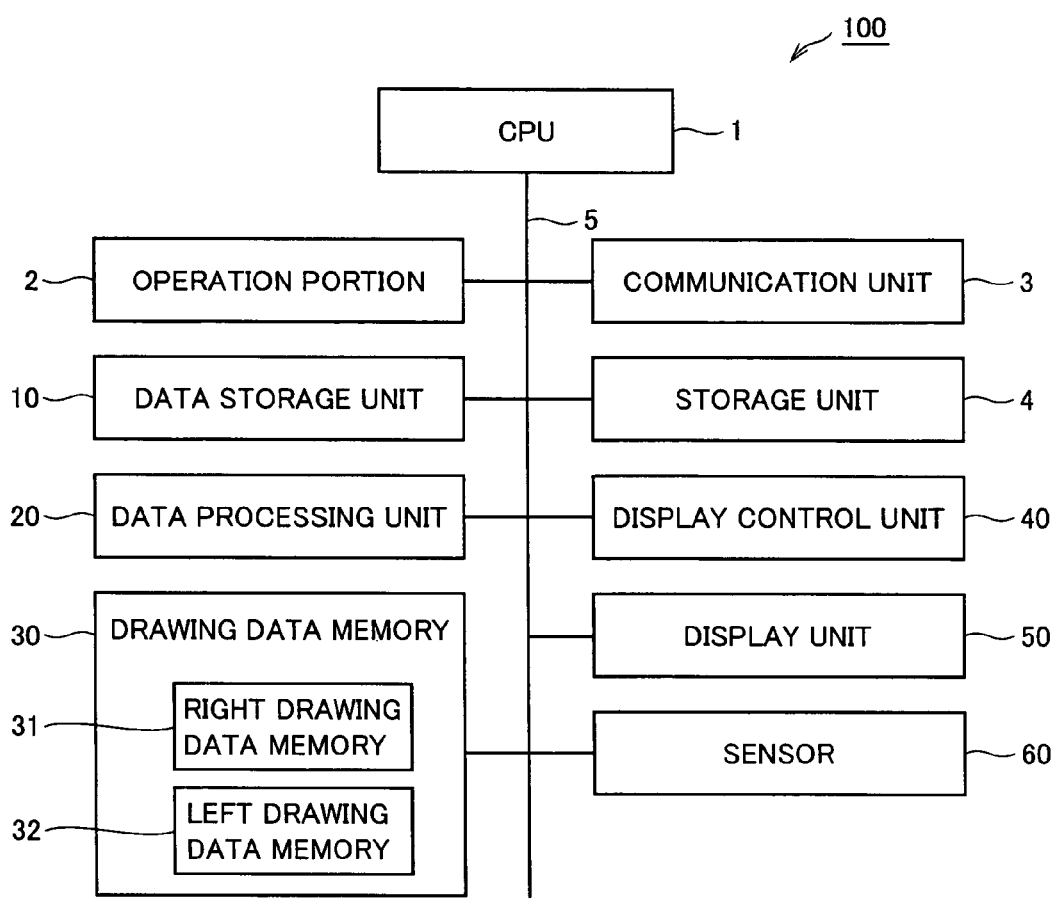
FIG. 1 is a block diagram showing a specific example of a configuration of a portable phone 100 in an embodiment.

1 CPU; 2 operation portion; 3 communication unit; 4 storage unit; 5 bus; 10 data storage unit; 20 data processing unit; 21 division/cut-out control unit; 22 memory transfer control unit; 30 screen data memory; 31 right screen data memory; 32 left screen data memory; 40 display control unit; 50 display unit; 51 data display unit; 52 slit board; 53 backlight; 60 sensor; 511 to 517 areas on data display unit; 521 closed portion; and 522, 523 opening portion.

BEST MODES FOR CARRYING OUT THE INVENTION

An embodiment of the present invention will be described hereinafter with reference to the drawings. The same elements and components have the same reference characters allotted. Their label and function are also identical. Therefore, detailed description thereof will not be repeated.

Though an example in which a portable display device according to the present invention is implemented by a portable phone is described in the present embodiment, the portable display device according to the present invention is naturally not limited to the portable phone, and may be implemented by other devices such as a PDA (Personal Digital Assistant).

FIG. 1 is a block diagram showing a specific example of a configuration of a portable phone 100 in the present embodiment. Referring to FIG. 1, portable phone 100 of the present embodiment includes a CPU (Central Processing Unit) 1, which is responsible for overall control of portable phone 100. A program executed in CPU 1 is stored in an ROM (Read Only Memory) implementing a storage unit 4. In addition, an RAM (Random Access Memory) implementing storage unit 4 serves as a work area when CPU 1 executes the program.

In addition, portable phone 100 communicates through its communication unit 3 with another phone via a base station, transmits/receives an e-mail, or transmits/receives information through the Internet. It is assumed in the present embodiment that data obtained through communication unit 3 is displayed on display unit 50. If portable phone 100 attains a function to create data such as text data or image data, however, the data created on portable phone 100 may naturally be displayed on display unit 50 and similar processing is performed also in that case.

Portable phone 100 includes an operation portion 2 such as a numeric key or a scroll key, display unit 50 responsible for screen display, a display control unit 40 controlling display on display unit 50, a data storage unit 10 storing data to be displayed, that has been obtained through communication unit 3, a data processing unit 20 subjecting data stored in data storage unit 10 to processing for display on display unit 50, a screen data memory 30 serving as a memory including a right screen data memory 31 and a left screen data memory 32 for display on display unit 50, and a sensor 60 sensing change in an angle of orientation of display unit 50, all of which are connected to CPU 1, communication unit 3 and storage unit 4 through a bus 5.

Figure 2:
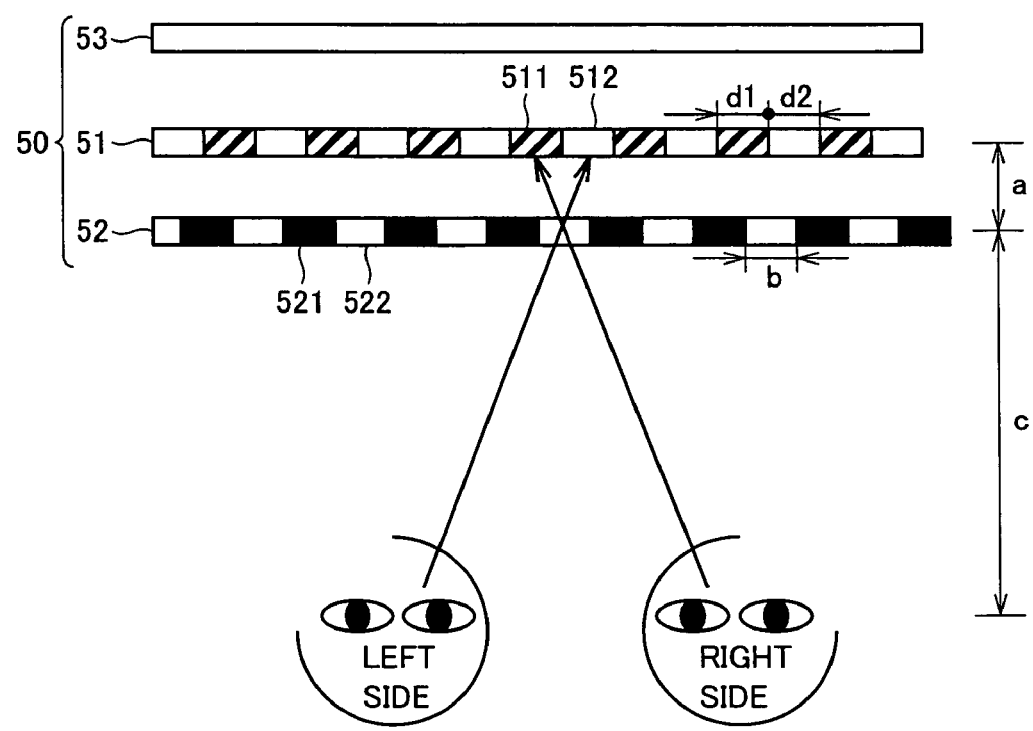
FIG. 2 shows a specific example of a configuration of a display unit 50.

FIG. 2 shows a specific example of a configuration of display unit 50. Referring to FIG. 2, display unit 50 includes a data display unit 51 serving as a liquid crystal display that displays screen data, a slit board 52 serving as a liquid crystal display provided in front of data display unit 51, that is, on a side closer to a viewer by a distance a, and a backlight 53 serving as an illumination device provided in the rear of data display unit 51, that is, on a side distant from the viewer.

Data display unit 51 is controlled by display control unit 40, so that a plurality of right screen display areas 511 each having a width d1 for showing the right screen and a plurality of left screen display areas 512 each having a width d2 for showing the left screen, both of which are vertically long bar-like areas, are formed alternately in the order of area 511 and area 512 from the left, as shown in FIG. 2.

Slit board 52 is controlled by display control unit 40, so that a closed portion 521 through which data display unit 51 in the rear cannot be seen from the front and an opening portion 522 having a width c through which data display unit 51 in the rear can be seen from the front are implemented. Display control unit 40 controls slit board 52 serving as the liquid crystal display, so that closed portion 521 is configured as a dark portion whereas opening portion 522 is configured to be transparent.

Closed portion 521 and opening portion 522 are implemented in slit plate 52 and right screen display area 511 and left screen display area 512 are implemented in data display unit 51, so that the right screen displayed in right screen display area 511 is displayed in a direction toward the viewer located on the right with respect to display unit 50 through opening portion 522, and visually recognized by the viewer located on the right with respect to display unit 50. Meanwhile, the left screen displayed in left screen display area 512 is displayed in a direction toward the viewer located on the left with respect to display unit 50 through opening portion 522, and visually recognized by the viewer located on the left with respect to display unit 50. In other words, the viewer can view different types of screens, i.e., the right screen and the left screen, by viewing display unit 50 while he/she is located on the right with respect to display unit 50 and by viewing display unit 50 while he/she is located on the left with respect to the same, and portable phone 100 realizes what is called dual-view display in which a first screen and a second screen are simultaneously displayed in left and right directions respectively. It is noted that distance a between data display unit 51 and slit board 52, width d1 of right screen display area 511, and width d2 of left screen display area 512 are set to an optimal value determined based on a distance c from the viewer to display unit 50 when the viewer uses portable phone 100 in an ordinary manner, and they are not specifically limited herein.

A configuration of data processing unit 20 shown in FIG. 1 and flow of data processing in portable phone 100 will be described with reference to FIG. 3.

Figure 3:
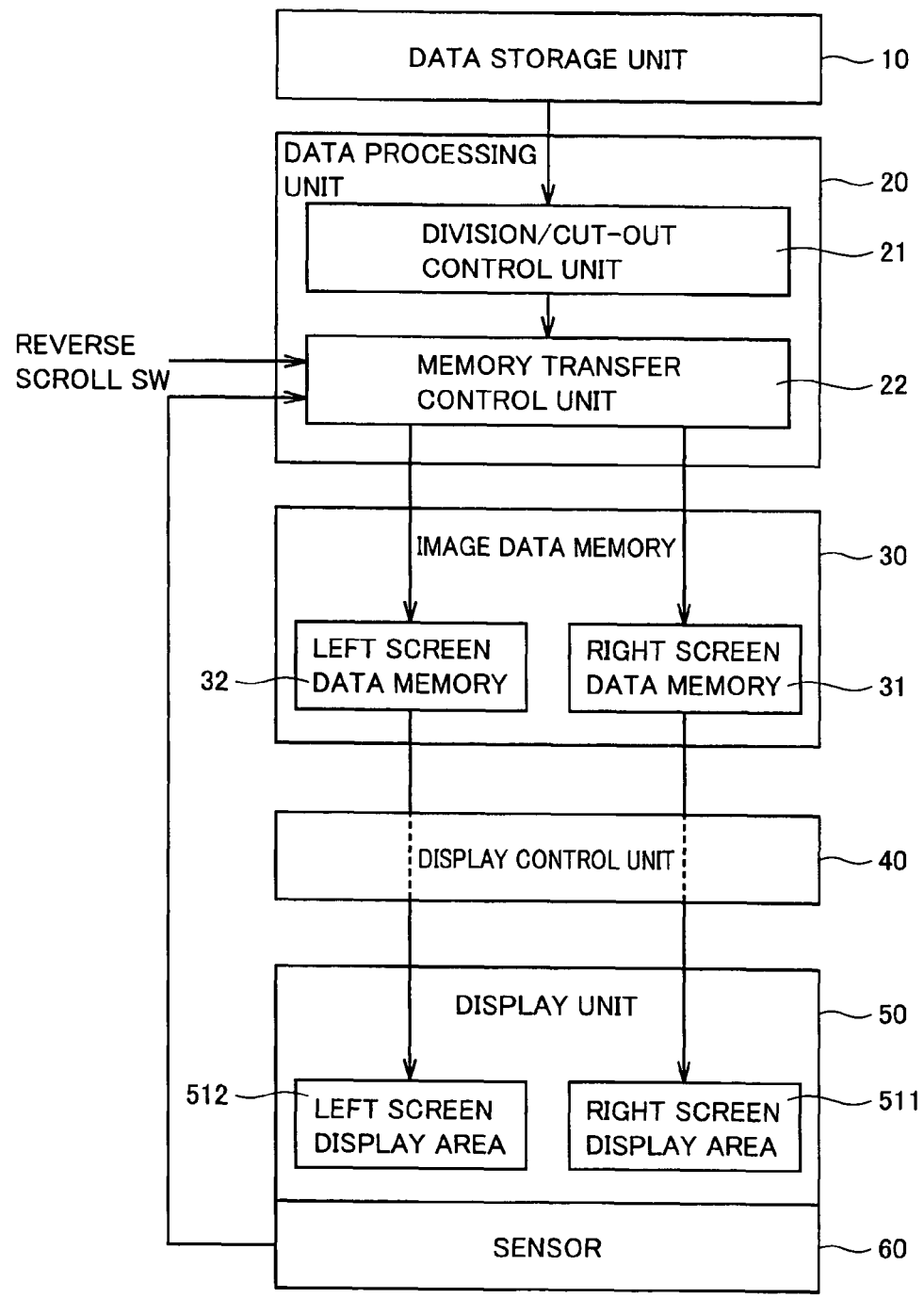
FIG. 3 illustrates a configuration of a data processing unit 20 and flow of data processing in portable phone 100.

Referring to FIG. 3, data processing unit 20 operates upon receiving a control signal from CPU 1, and functions of data processing unit 20 include a division/cut-out control unit 21 and a memory transfer control unit 22.

Division/cut-out control unit 21 reads data stored in data storage unit 10, and divides the data based on a possible display size of display unit 50. Alternatively, division/cut-out control unit 21 cuts out data having a size comparable to a possible display size of display unit 50. Thereafter, division/cut-out control unit 21 passes the divided or cut-out data to memory transfer control unit 22 as screen data.

Sensor 60 is arranged in the vicinity of display unit 50. When sensor 60 senses clockwise or counterclockwise angular acceleration of display unit 50 not smaller than a prescribed value while the screen is displayed on display unit 50, sensor 60 outputs the angular acceleration converted into a sensor signal to memory transfer control unit 22. Change in an angle of orientation of display unit 50 is thus sensed.

Memory transfer control unit 22 loads right screen data and left screen data among the screen data passed from division/cut-out control unit 21, into right screen data memory 31 of screen data memory 30 and into left screen data memory 32 thereof respectively, based on a sensor signal from sensor 60 and on a switch signal from a not-shown reverse scroll switch (SW) as required.

Display control unit 40 controls display unit 50 such that it is configured as shown in FIG. 2. Namely, display control unit 40 causes the right screen data loaded into right screen data memory 31 and the left screen data loaded into left screen data memory 32 to be displayed in right screen display area 511 and left screen display area 512 respectively.

Data division and cut-out processing in division/cut-out control unit 21 will be described with reference to FIGS. 4 and 5.

Figure 4:
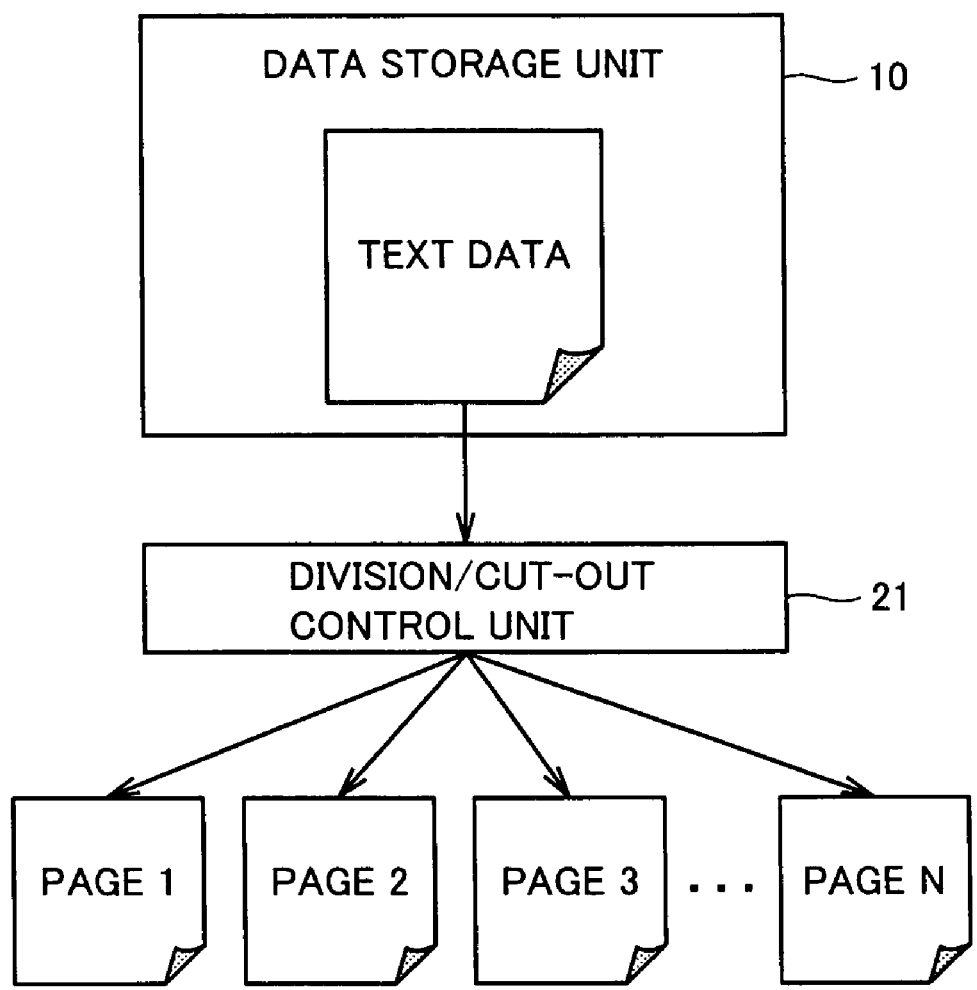
FIG. 4 illustrates data division and cut-out processing in a division/cut-out control unit 21.

Referring to FIG. 4, if data to be displayed that is stored in data storage unit 10 is text data such as mail data, division/cut-out control unit 21 reads text data from data storage unit 10, divides the text data into a possible display size of display unit 50 sequentially from the beginning of the main text of the text data, and cuts out page 1, page 2, . . . , and page N. This division/cut-out method is suitable for an example in which the data to be displayed is of such a characteristic that its content is not adversely affected even if the data is divided at an arbitrary position and individual data is sequentially cut out and displayed, that is, arrangement of the data is flexible, as in the case of text data.

Figure 5:
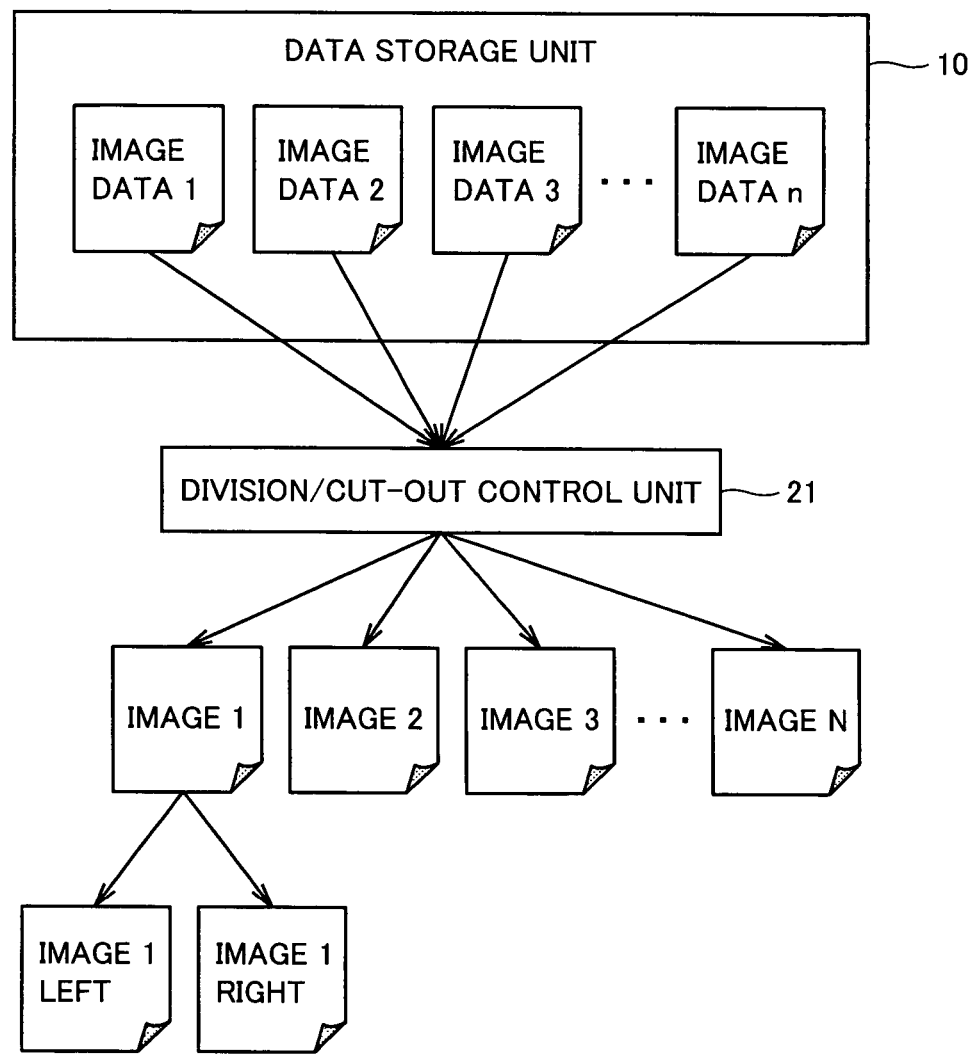
FIG. 5 illustrates data division and cut-out processing in division/cut-out control unit 21.

Alternatively, referring to FIG. 5, if data to be displayed that is stored in data storage unit 10 contains image data such as a photograph or illustration, division/cut-out control unit 21 reads data from data storage unit 10, and cuts out data having a possible display size of two screens of the right screen and the left screen of display unit 50, that is, twice the possible display size of display unit 50, sequentially from the beginning of the data, whereby data is cut out as image 1, image 2, . . . , and image N. In addition, division/cut-out control unit 21 divides each cut-out image into image right data for right screen data and image left data for left screen data. This division/cut-out method is suitable for an example in which the data to be displayed is of such a characteristic that its content is adversely affected unless each data is arranged side by side when the data is divided at an arbitrary position, that is, arrangement of the data is somewhat fixed, as in the case of image data.

Screen display processing in portable phone 100 in the present embodiment will be described with reference to the flowchart in FIG. 6. The processing shown in the flowchart in FIG. 6 is performed in such a manner that CPU 1 of portable phone 100 reads a program stored in the ROM of storage unit 4, executes the program in the RAM, and controls each unit shown in FIG. 1 so as to cause each unit shown in FIG. 3 to function.

Figure 6:
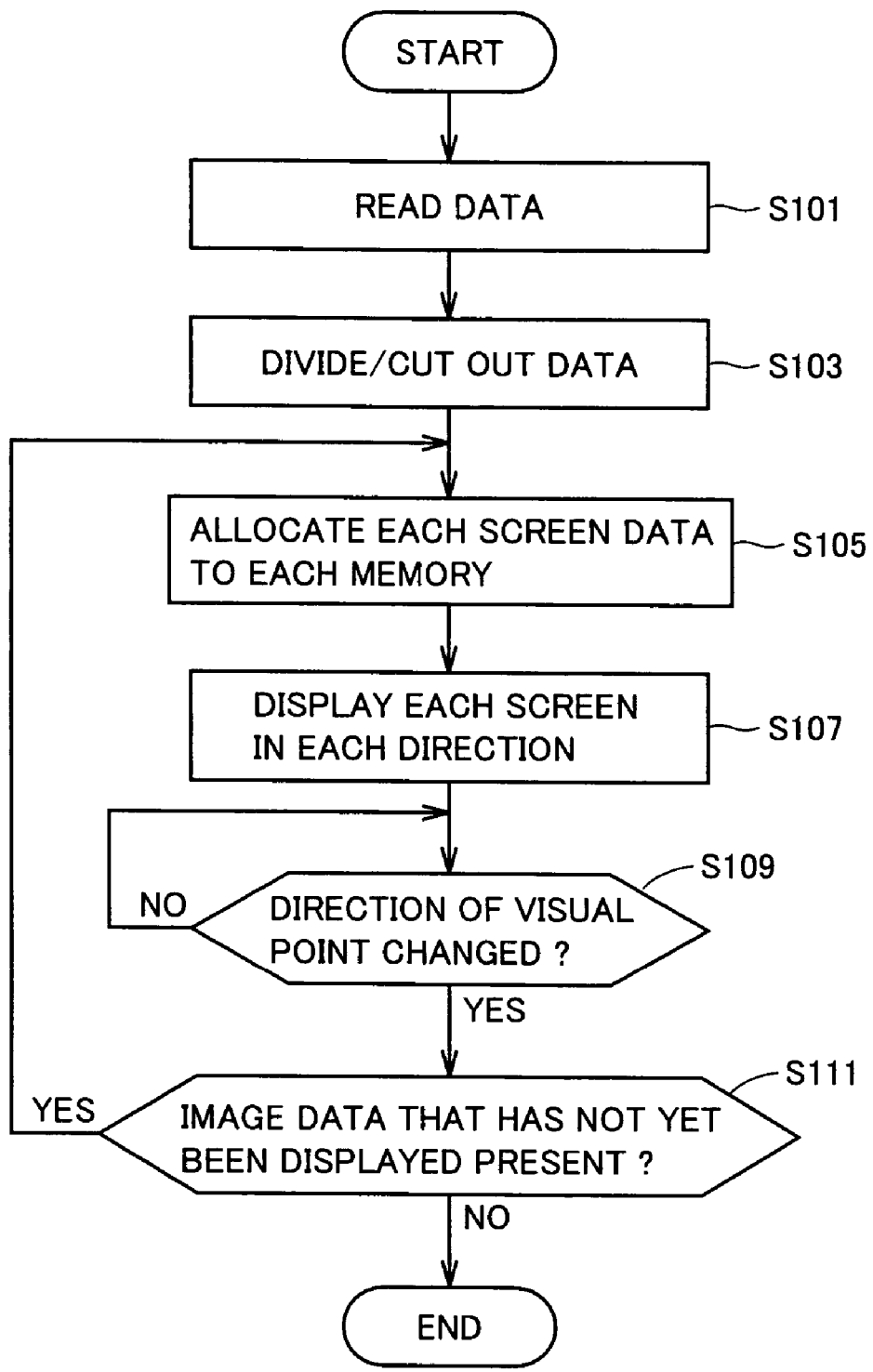
FIG. 6 is a flowchart showing screen display processing in portable phone 100 in the embodiment.

Referring to FIG. 6, initially at step S101, data processing unit 20 reads data to be displayed, that is stored in data storage unit 10. At step S103, division/cut-out control unit 21 performs division/cut-out processing for that data. The division/cut-out processing at step S103 is as described previously with reference to FIGS. 4 and 5.

Thereafter at step S105, memory transfer control unit 22 loads the right screen data and the left screen data to be displayed, out of the right screen data and the left screen data obtained through the division/cut-out processing at step S103, into right screen data memory 31 and left screen data memory 32 respectively. The screen data loaded into the screen data memory at step S105 is displayed in right screen display area 511 and left screen display area 512 of display unit 50 at step S107, under the control of display control unit 40.

At step S109, sensor 60 senses change in the angle of orientation of display unit 50 (YES at S109). If there is screen data that has not yet been displayed on display unit 50 (YES at S111), the process returns to step S105, at which right screen data and left screen data to be displayed next are loaded into right screen data memory 31 and left screen data memory 32 respectively. Then, at step S107, the right screen data and the left screen data are displayed in right screen display area 511 and left screen display area 512 of display unit 50 respectively.

Steps S105 to S109 described above are repeated until all screen data obtained through the division/cut-out processing at step S103 are displayed on display unit 50. When all screen data are displayed (NO at S111), the screen display processing ends.

The foregoing is the screen display processing in portable phone 100 according to the present embodiment.

The screen display processing described above is performed, so that the following screen display is specifically realized in portable phone 100.

Figure 7:
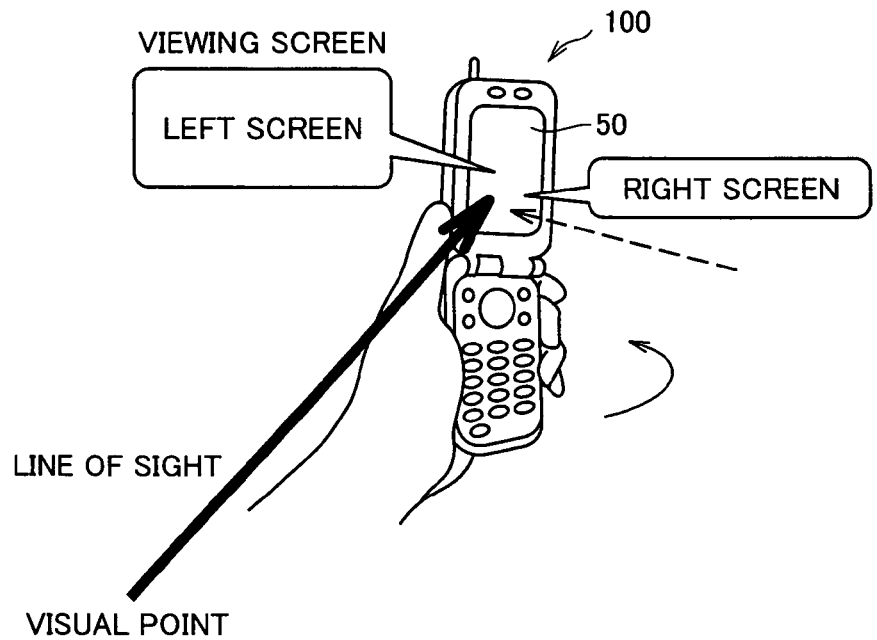
FIG. 7 shows a specific example of a first state of portable phone 100.
Figure 8:
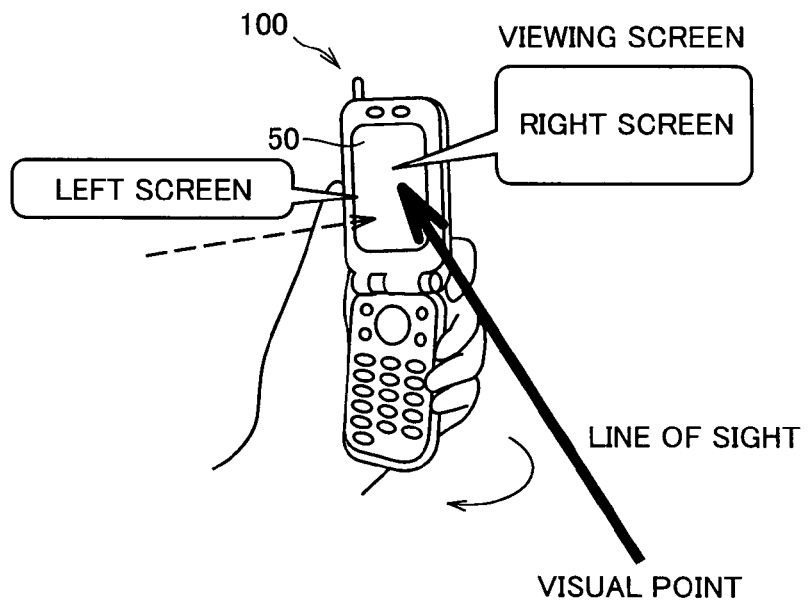
FIG. 8 shows a specific example of a second state of portable phone 100.

FIGS. 7 and 8 show a first state and a second state of portable phone 100, determined by relation between display unit 50 of portable phone 100 and line of sight of the viewer. Specifically, in the present embodiment, the state shown in FIG. 7, in which the visual point of the viewer is located on the left with respect to display unit 50 and display unit 50 of portable phone 100 is oriented to the right so that the viewer visually recognizes display unit 50 from the left side of display unit 50, is assumed as the first state. Meanwhile, the state shown in FIG. 8, in which the visual point of the viewer is located on the right with respect to display unit 50 and display unit 50 of portable phone 100 is oriented to the left so that the viewer visually recognizes display unit 50 from the right side of display unit 50, is assumed as the second state.

As shown in FIGS. 7 and 8, portable phone 100 simultaneously displays on display unit 50 the left screen serving as the first screen oriented to the viewer located on the left and the right screen serving as the second screen oriented to the viewer located on the right. Therefore, in the first state, the viewer visually recognizes the first screen, while in the second state, the viewer visually recognizes the second screen.

The first and second states are switched by an operation to turn a hand of the viewer holding portable phone 100. Here, sensor 60 senses occurrence of the switching operation by sensing clockwise or counterclockwise angular acceleration of display unit 50 not smaller than a prescribed value while the screen is displayed on display unit 50. In the present embodiment, a method of sensing the angular acceleration by means of sensor 60 is not limited, and a sensing technique conventionally used in general will suffice. In addition, sensing of occurrence of the switching operation is not limited to a method of detecting change in the angular acceleration by means of sensor 60, and another method may be employed.

Specifically, occurrence of the switching operation may be sensed, for example, by using as sensor 60 an angle sensor sensing an angle with regard to a direction of the switching operation so as to sense change in the angle of display unit 50 while the screen is displayed on display unit 50, or by using as sensor 60 an angular velocity sensor sensing an angular velocity so as to sense angular acceleration of display unit 50 not smaller than a prescribed value while the screen is displayed on display unit 50.

Alternatively, for example, an inclination sensor such as a horizontal bubble tube for detecting inclination of portable phone 100 may be employed as sensor 60. When the viewer switches between the first state and the second state of portable phone 100, inclination with respect to the horizontal direction varies in many cases. Accordingly, sensor 60 may sense occurrence of the switching operation by sensing variation in inclination with respect to the horizontal direction while the screen is displayed on display unit 50 and by detecting an operation to turn the hand of the viewer based on the fact that the inclination is of magnitude not smaller than the prescribed value.

Alternatively, for example, a pressure sensor provided on each of left and right ends of portable phone 100 may be employed as sensor 60. When the viewer switches from the first state to the second state of portable phone 100, pressure of the finger located on the right with respect to display unit 50 is greater than the pressure of the finger located on the left, in the orientation shown in FIG. 7. Therefore, by sensing a pressure difference therebetween, whether or not an operation for switching from the first state to the second state has been made can be detected. This is also applicable to switching from the second state to the first state. Sensor 60 may sense occurrence of the switching operation by detecting the pressure sensed by the pressure sensors on the left and right ends while the screen is displayed on display unit 50 and by detecting the operation for turning the hand of the viewer based on the fact that the pressure difference is not smaller than a prescribed value.

A first specific example and a second specific example of a display screen in the first state and the second state and change in display as a result of the operation for switching between the first state and the second state will be described with reference to FIGS. 9 and 10. In the present specific examples, the first state is assumed as an initial state and it is assumed that the first state and the second state are repeated sequentially. In addition, as to the data to be displayed, it is assumed that data of which arrangement is flexible such as the text data described with reference to FIG. 4 is employed in the first specific example, and that data of which arrangement is somewhat fixed such as the image data described with reference to FIG. 5 is employed in the second specific example.

Figure 9:
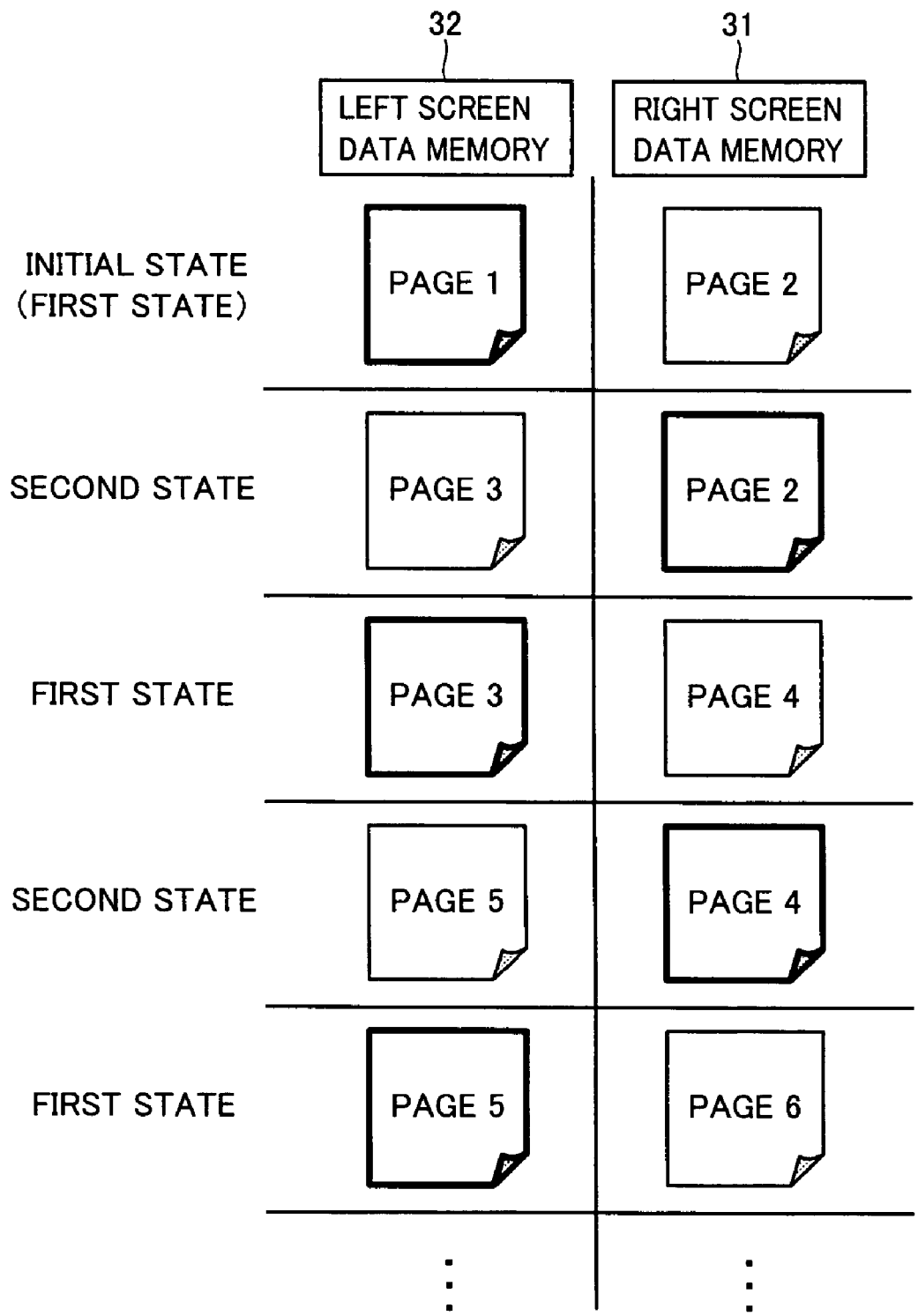
FIG. 9 illustrates a first specific example of display screens in the first state and the second state and change in display as a result of an operation for switching between the first state and the second state.

Referring to FIG. 9, in the first specific example, in the initial state in which data stored in data storage unit 10 is displayed on display unit 50, screen data of page 1 and page 2 are loaded into left screen data memory 32 and right screen data memory 31 respectively, and page 1 is displayed in left screen display area 512 of display unit 50 in the left direction and page 2 is displayed in right screen display area 511 in the right direction. In the first state which is the initial state, the viewer views page 1 displayed in left screen display area 512 from the left side with respect to display unit 50. In FIG. 9, screen data of the screen being viewed by the viewer in that state is shown with a bold line.

Thereafter, when the switching operation is sensed in the initial state and transition to the second state is made, memory transfer control unit 22 transfers screen data of page 3 which is next screen data to left screen data memory 32. Consequently, display control unit 40 causes page 3 to be displayed in left screen display area 512 in the left direction and causes page 2 to be displayed in right screen display area 511 in the right direction. The viewer is viewing page 2 displayed in right screen display area 511 from the right side with respect to display unit 50.

Thereafter, when the switching operation is sensed in the second state and transition to the first state is made, memory transfer control unit 22 transfers screen data of page 4 which is next screen data to right screen data memory 31. Consequently, display control unit 40 causes page 3 to be displayed in left screen display area 512 in the left direction and causes page 4 to be displayed in right screen display area 511 in the right direction. The viewer is viewing page 3 displayed in left screen display area 512 from the left side with respect to display unit 50.

Thereafter, the processing described above is sequentially repeated. In portable phone 100 according to the first specific example, right screen data memory 31 and left screen data memory 32 are thus sequentially rewritten in response to the switching operation performed by the viewer, and display on display unit 50 is sequentially switched for each switching operation. In this manner, the viewer can scroll the data with natural operation as if he/she turns pages of a book, and can obtain a large amount of information on one screen. In addition, portable phone 100 can present a large amount of information on display unit 50 while achieving smaller size.

Figure 10:
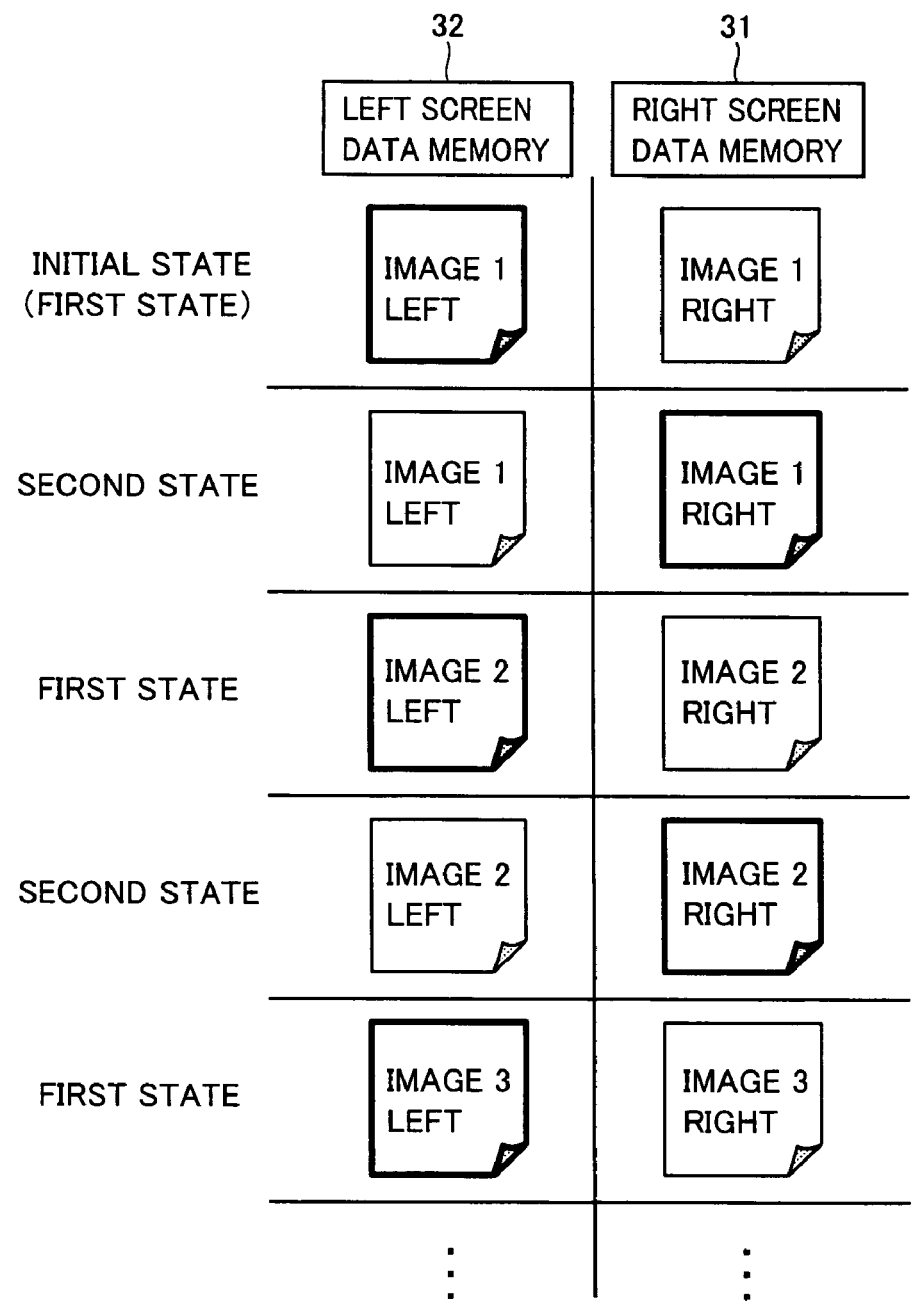
FIG. 10 illustrates a second specific example of display screens in the first state and the second state and change in display as a result of an operation for switching between the first state and the second state.

Referring now to FIG. 10, in the second specific example, the initial state in which data stored in data storage unit 10 is displayed on display unit 50 is the same as shown in FIG. 9. Therefore, description thereof will not be repeated.

In the second specific example, even when the switching operation is sensed in the initial state and transition to the second state is made, memory transfer control unit 22 does not rewrite screen data memory 30 but maintains a memory state similar to the first state which is the initial state. The viewer is viewing the right-side screen of image 1 displayed in right screen display area 511 from the right side with respect to display unit 50.

Thereafter, when the switching operation is sensed in the second state and transition to the first state is made, memory transfer control unit 22 transfers image 2 left data and image 2 right data which are next screen data to left screen data memory 32 and right screen data memory 31 respectively. Consequently, display control unit 40 causes the left-side screen of image 2 to be displayed in left screen display area 512 in the left direction and causes the right-side screen of image 2 to be displayed in right screen display area 511 in the right direction. The viewer is viewing the left-side screen of image 2 displayed in left screen display area 512 from the left side with respect to display unit 50.

Similarly, in the second specific example, even when the switching operation is sensed in the first state and transition to the second state is made, memory transfer control unit 22 does not rewrite screen data memory 30 but maintains a memory state similar to the first state. The viewer is viewing the right-side screen of image 2 displayed in right screen display area 511 from the right side with respect to display unit 50. Portable phone 100 can present a large amount of information on display unit 50 while achieving smaller size.

Thereafter, the processing described above is sequentially repeated. In portable phone 100 according to the second specific example, right screen data memory 31 and left screen data memory 32 are thus sequentially rewritten in response to the operation for switching from the second state to the first state performed by the viewer, and display on display unit 50 is sequentially switched for each switching operation. In this manner, the viewer can scroll the data with natural operation as if he/she views a picture while inclining the same, and can obtain a large amount of information on one screen.

Here, the switching operation using the reverse scroll switch described with reference to FIG. 3 will be discussed. As described above, the operation for switching between the first state and the second state shown in FIGS. 7 and 8 is performed by turning the hand of the viewer who holds portable phone 100. When the viewer desires not to view next data but to display again the screen that has been viewed immediately before, that is, when the viewer performs what is called reverse scroll, the viewer turns the hand while pressing the reverse scroll switch. Therefore, the reverse scroll switch is preferably in a position and a shape permitting pressing in such a holding state that the viewer holds portable phone 100 and views display unit 50 in the state as shown in FIGS. 7 and 8. In addition, in order to realize reverse scroll, screen data memory 30 includes a cache not shown in FIG. 1, which holds screen data that has been displayed immediately before.

Upon receiving a sensor signal from sensor 60 indicating occurrence of the switching operation and a switch signal from the reverse scroll switch, memory transfer control unit 22 loads the screen data held in cache 33 into the data memory corresponding to the area where it should be displayed.

A specific example of a display screen in the first state and the second state and change in display as a result of the operation for switching between the first state and the second state when reverse scroll is enabled will be described with reference to FIG. 11. In the present specific example, as to the data to be displayed, description will be given assuming that data of which arrangement is flexible such as the text data described with reference to FIG. 4 is employed in the first specific example. Meanwhile, as reverse scroll is similarly performed also for data of which arrangement is somewhat fixed such as the image data described with reference to FIG. 5, description of the latter case will not be repeated.

Figure 11:
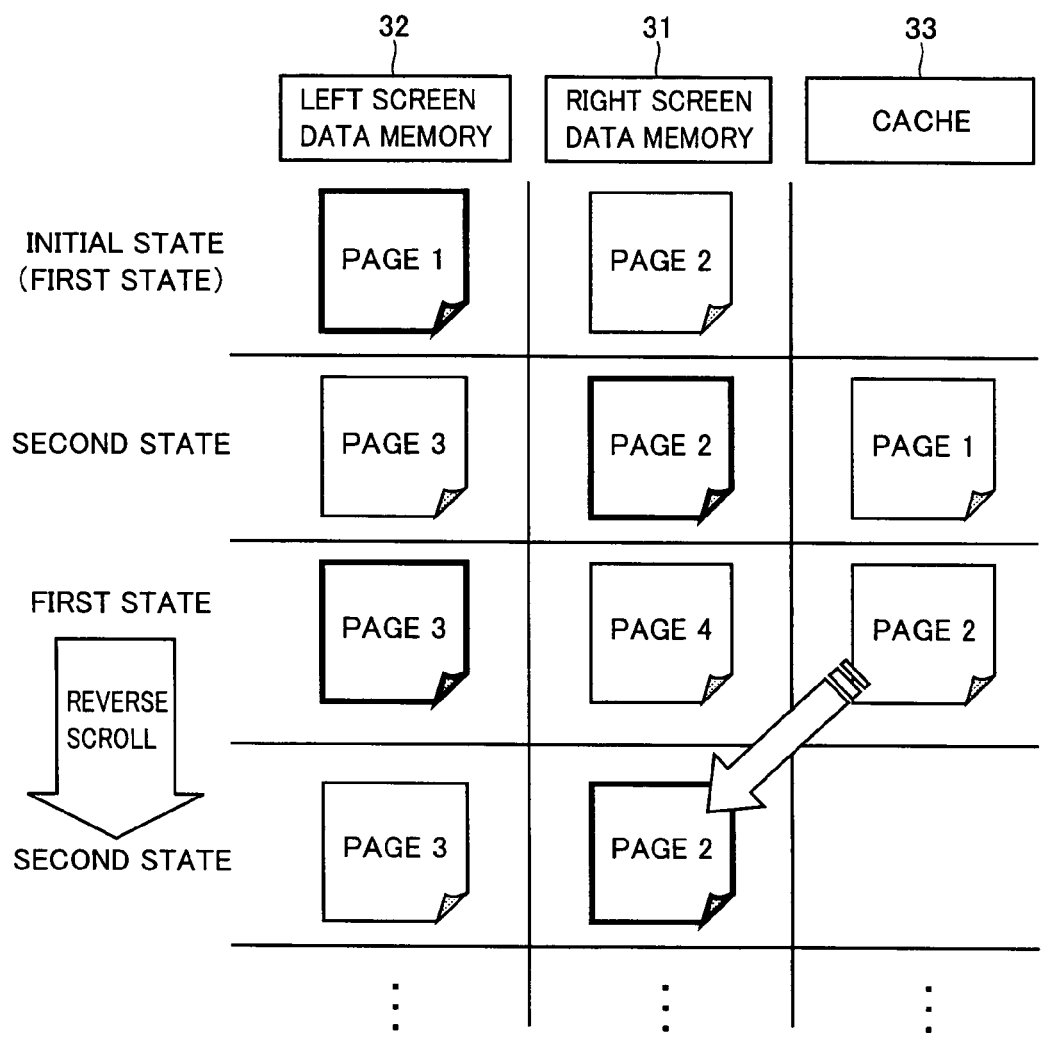
FIG. 11 illustrates a specific example of display screens in the first state and the second state and change in display as a result of an operation for switching between the first state and the second state, when reverse scroll is enabled.

Referring to FIG. 11, in the present specific example, the initial state in which data stored in data storage unit 10 is displayed on display unit 50 is the same as shown in FIG. 9. Therefore, description thereof will not be repeated.

Thereafter, when the switching operation is sensed in the initial state and transition to the second state is made, memory transfer control unit 22 transfers screen data of page 3 which is next screen data to left screen data memory 32. In addition, the screen data of page 1 that has been loaded into left screen data memory 32 immediately before is moved to cache 33. Consequently, display control unit 40 causes page 3 to be displayed in left screen display area 512 in the left direction and causes page 2 to be displayed in right screen display area 511 in the right direction. The viewer is viewing page 2 displayed in right screen display area 511 from the right side with respect to display unit 50.

Thereafter, when the switching operation is sensed in the second state and transition to the first state is made, memory transfer control unit 22 transfers screen data of page 4 which is next screen data to right screen data memory 31. In addition, the screen data of page 2 that has been loaded into right screen data memory 31 immediately before is moved to cache 33. Consequently, display control unit 40 causes page 3 to be displayed in left screen display area 512 in the left direction and causes page 4 to be displayed in right screen display area 511 in the right direction. The viewer is viewing page 3 displayed in left screen display area 512 from the left side with respect to display unit 50.

Here, when the switching operation by pressing the reverse scroll switch, that is, the reverse scroll operation, is sensed in the first state, memory transfer control unit 22 moves the screen data of page 2 held in cache 33 to right screen data memory 31, and replaces the screen data of page 4 that has been loaded with the screen data of page 2. Consequently, display control unit 40 causes page 2 to be displayed again in right screen display area 511 in the right direction. After viewing page 3 displayed in left screen display area 512 from the left side with respect to display unit 50, the viewer views page 2 displayed in right screen display area 511 from the right side with respect to display unit 50.

As a result of such processing, in portable phone 100 according to the present specific example, the screen data that has been displayed immediately before is held sequentially in the cache, so that the screen that has been displayed immediately before is displayed again in response to the switching operation implemented by pressing the reverse scroll switch, i.e., the reverse scroll operation. In this manner, the viewer can scroll in the reverse direction with natural operation as if he/she turns back a page of a book to view a previous page, and can obtain again information that was displayed previously.

In the present specific example, an example in which cache 33 holds solely screen data that has been displayed immediately before is shown. Naturally, however, an arbitrary set of previously displayed screen data can be held by preparing a plurality of caches in screen data memory 30 at the time of design, so that similar processing can be performed by repeating the reverse scroll operations described above, to sequentially display the previous screen data.

In portable phone 100 according to the present embodiment, switching between what is called a single-view display mode, which represents a normal display mode in which the same screen is displayed in all directions within a viewing angle of the liquid crystal, and the dual-view display mode described above is made. Switching between the display modes may be performed in response to an instruction from the viewer, or may automatically be performed in accordance with an attribute of data to be displayed such as a type or a size, or may automatically be performed in accordance with an application for displaying the data. For example, when a large-size mail is displayed, the display mode may automatically be switched from the single-view display mode to the dual-view display mode. Alternatively, in executing a mail application, the display mode may automatically be switched from the single-view display mode to the dual-view display mode.

Figure 12:
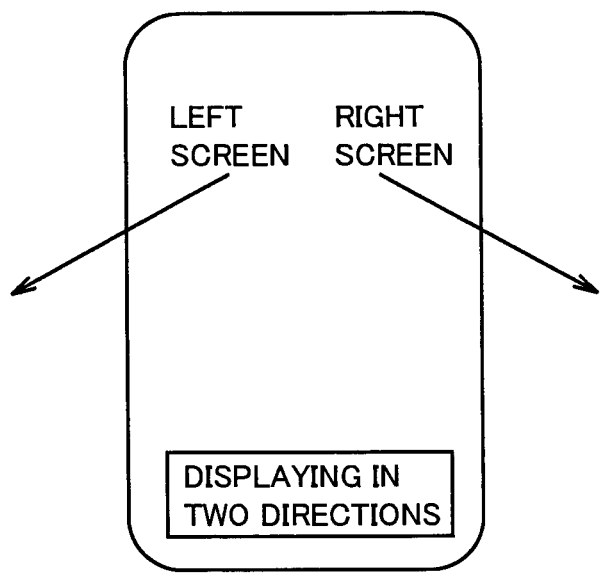
FIG. 12 shows a specific example of different types of display in the same screen.

While the dual-view display described above is realized on portable phone 100, it may be difficult to view the display from the front. For example, when the viewer did not notice switching such as automatic switching from the single-view display mode to the dual-view display mode as described above, viewing of the display may be difficult. Accordingly, in order to notify the viewer of a current display mode such as "dual-view display," preferably, a single-view display area is provided in the dual-view display and an icon or text data notifying the viewer of the current display mode is displayed in that area during dual-view display in portable phone 100, as shown in FIG. 12.

Figure 13:
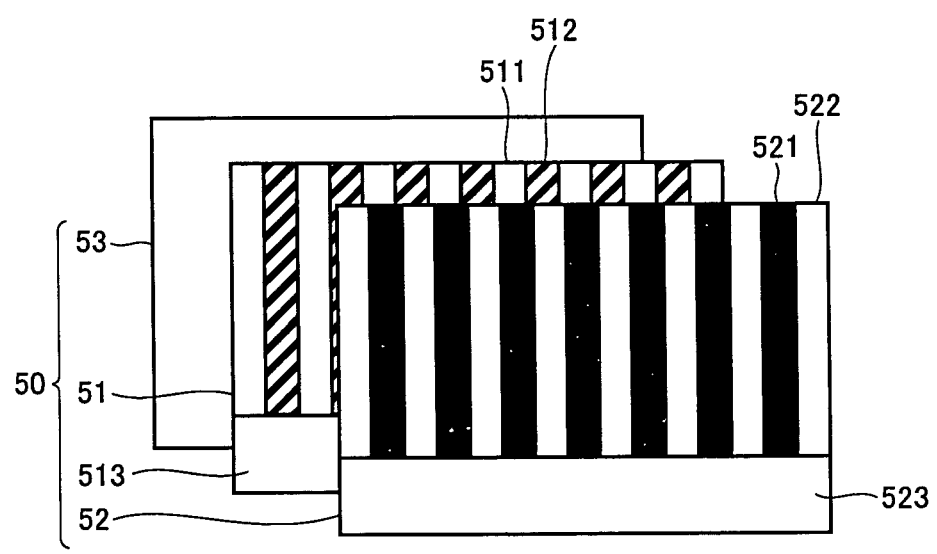
FIG. 13 shows a specific example of a configuration of a data display unit 51 and a slit board 52 when display unit 50 further includes a display area in a normal direction.

In this case, as shown in FIG. 13, as a result of control by display control unit 40, not only right screen display area 511 and left screen display area 512 for dual-view display but also an area 513 serving as a display area for single-view display are implemented in data display unit 51. In slit board 52, a transparent electrode (not shown) is arranged such that closed portion 521 and opening portion 522 can alternately be implemented in an area corresponding to areas 511, 512 of data display unit 51 under the control of display control unit 40, as shown in FIG. 13. In addition, in the entire area corresponding to area 513 of data display unit 51, slit board 52 is configured so as not to include the transparent electrode described above, so that slit board 52 is constantly in an opened state, thereby implementing an opening portion 523.

When a set of screens showing an image of a three-dimensional object viewed from the left and right is simultaneously displayed in dual-view manner on display unit 50 using a similar configuration as well, the screen visually recognized from all directions may be displayed in single-view manner. For example, a screen showing an image of a three-dimensional object may be displayed in dual-view manner, and simultaneously, a screen displaying caption for describing the three-dimensional object may be displayed in single-view manner.

In this manner, on display unit 50, the screen visually recognized from all directions is displayed in single-view manner along with a set of screens being displayed in dual-view manner, so that resolution of the screen displayed in single-view manner can be twice as high as that of the screen displayed in dual-view manner, whereby finer characters can be displayed. In addition, easily viewable display with higher resolution can be achieved, as compared with display of the screen in each direction. Therefore, the text such as caption is suitably displayed. As detailed portions can be displayed with high resolution, not only the caption but also a part of the set of screens may be displayed in single-view display.

Figure 16:
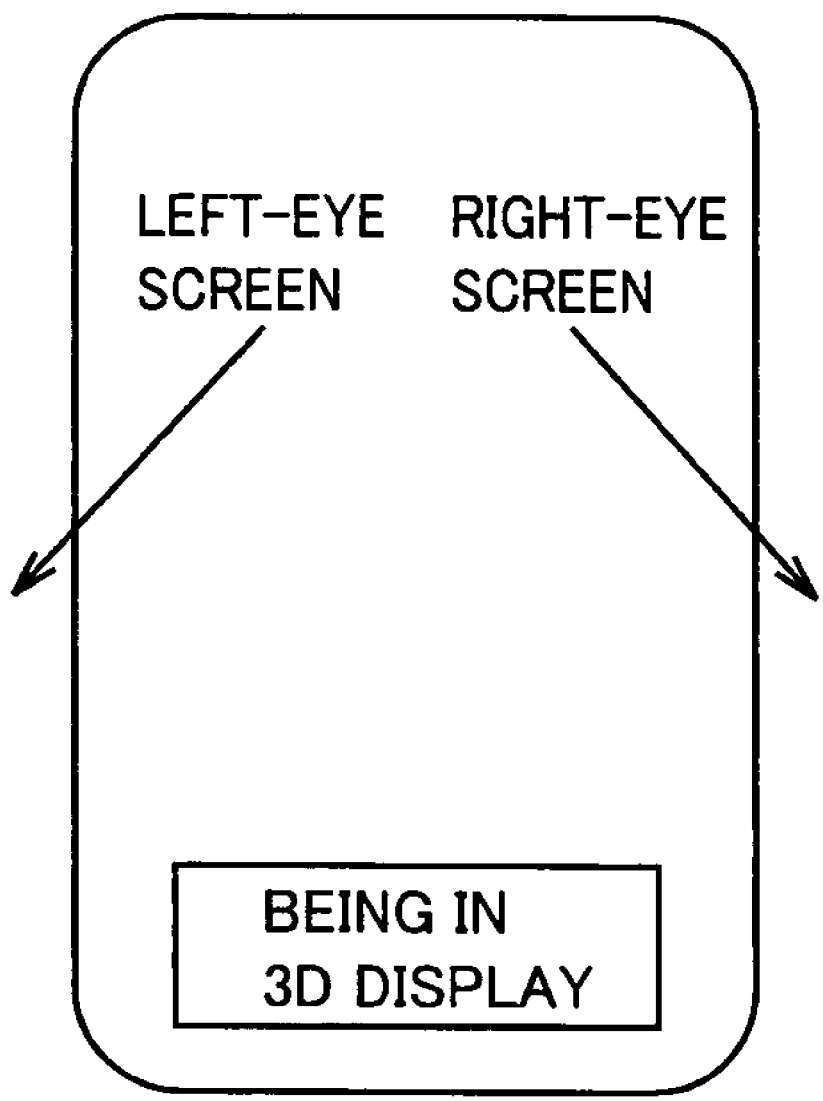
FIG. 16 shows a specific example of different types of display in the same screen.

In addition, as will be described hereinafter, even when stereoscopic (3D) display is realized by simultaneously displaying data for right-eye screen and data for left-eye screen on display unit 50 in portable phone 100, similarly, a common screen in which stereoscopic display is not realized may be displayed as a screen common to both eyes, as shown in FIG. 16. A configuration and control of display unit 50 in this example is the same as described above with reference to FIG. 13, and implementation of 3D display will be described later.

In this manner, the screen common to both eyes is displayed on display unit 50 along with the data for right-eye screen and the data for left-eye screen, so that resolution of the common screen can be higher and finer characters can be displayed. In addition, as binocular vision of the screen is allowed, visual recognition is easier for some people. Therefore, text such as caption is suitably displayed.

Moreover, in portable phone 100, switching between dual-view display described above and stereoscopic (3D) display utilizing parallax between an image recognized by the right eye of the viewer and an image recognized by the left eye of the same may be made.

Figure 14:
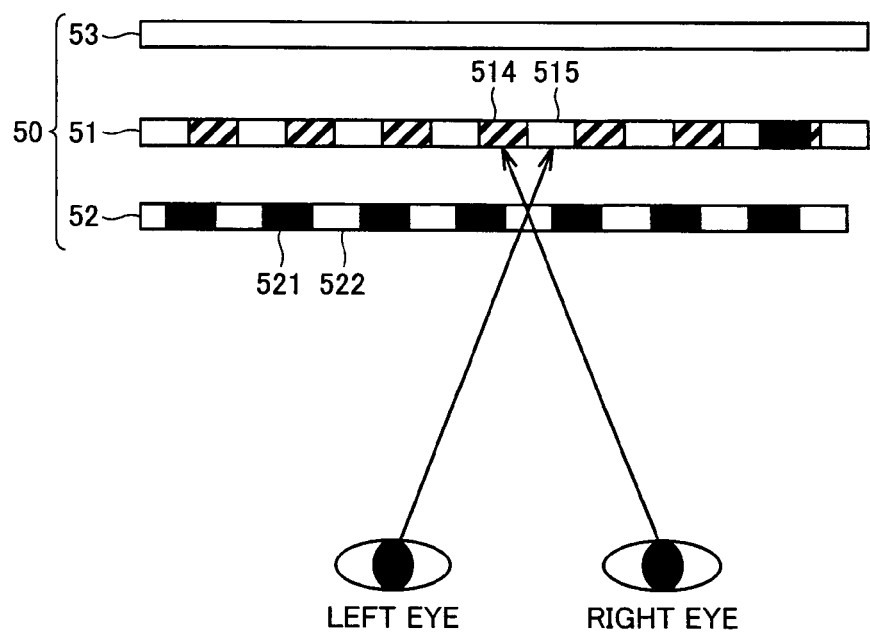
FIG. 14 illustrates control of display unit 50 when 3D display is realized in portable phone 100.

FIG. 14 illustrates control of display unit 50 when 3D display is realized in portable phone 100. Referring to FIG. 14, in 3D display, as a result of control by display control unit 40, a right-eye screen display area 514 displaying right-eye screen data which is data of a screen representing an image to be recognized by the right eye and a left-eye screen display area 515 displaying left-eye screen data which is data of a screen representing an image to be recognized by the left eye are implemented in data display unit 51 of display unit 50. In slit board 52, a transparent electrode (not shown) is arranged such that closed portion 521 and opening portion 522 are implemented under the control of display control unit 40. Therefore, the right-eye screen data displayed in right-eye screen display area 514 reaches the right eye of the viewer through opening portion 522, while the left-eye screen data displayed in left-eye screen display area 515 reaches the left eye of the viewer through opening portion 522. Accordingly, the viewer can stereoscopically view the screen displayed on display unit 50.

Further, in this example, a not-shown memory for right-eye screen and a not-shown memory for left-eye screen are included in display screen data memory 30 of portable phone 100, where the right-eye screen data and the left-eye screen data are loaded when 3D display is realized. Display control unit 40 controls display unit 50 such that data display unit 51 and slit board 52 of display unit 50 are switched to implement the configuration shown in FIG. 2 and the configuration shown in FIG. 9, whereby dual-view display and 3D display are realized in a switched manner.

In the embodiment described above, in dual-view display of portable phone 100, it has been assumed that the first screen is displayed in the left direction, while the second screen is displayed in the right direction. The direction of display of the first screen and the second screen, however, is not limited to the left and the right, and for example, it may be set to two types of directions of the front direction (or substantially front direction) and the left-right direction.

Figure 15:
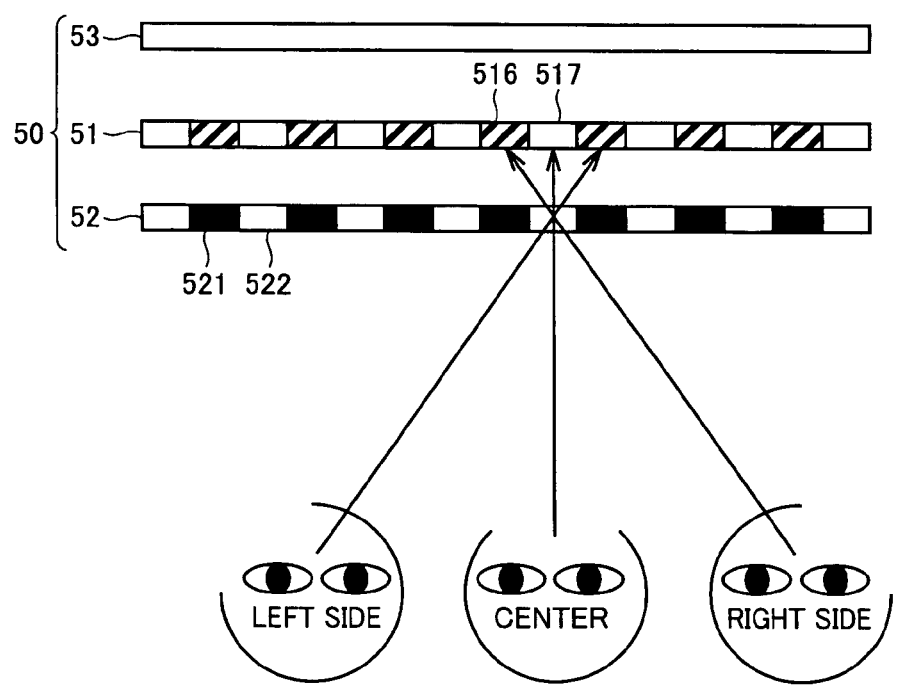
FIG. 15 shows another specific example of a configuration of display unit 50.

Specifically, FIG. 15 shows another specific example of a configuration of display unit 50. Referring to FIG. 15, in this example, in data display unit 51 of display unit 50, a left-right screen display area 516 instead of right-screen display area 511 and a front screen display area 517 instead of left-screen display area 512 are alternately implemented. In slit board 52, closed portion 521 and opening portion 522 are similarly implemented. In this case, a front screen displayed in front screen display area 517 is displayed through opening portion 522 in a direction toward the viewer located in front (or substantially in front) of display unit 50, and visually recognized by the viewer located in front of display unit 50. In addition, the left-right screen displayed in left-right screen display area 516 is displayed through opening portion 522 in a direction toward the viewer located on any of the left side and the right side with respect to display unit 50, and visually recognized by the viewer located on any of the left side and the right side with respect to display unit 50.

With such a configuration of portable phone 100 as well, the viewer can switch between the first screen and the second screen for viewing by performing the processing as described above without an operation using the scroll key, and can obtain a large amount of information. In addition, portable phone 100 can present a large amount of information on display unit 50 while achieving smaller size.

Such display is realized in portable phone 100, so that following usage is possible.

For example, in viewing a long mail, page 1 is displayed in the left direction, while page 2 is displayed in the right direction. Then, the display is sequentially changed, so that the mail can be viewed as if the viewer turns a page of a book, without the need for operating the scroll key.

Alternatively, for example, in writing a reply mail to a received mail, a reply mail creation screen can be displayed in the left direction, while the received mail can be displayed in the right direction. This is achieved in such a manner that data processing unit 20 processes each of the received mail and reply mail creation screen data, and loads respective screen data into right screen data memory 31 and left screen data memory 32. This is convenient because the reply mail can be created while viewing the received mail.

Further alternatively, bilingual display can also be realized, for example, by displaying a Japanese screen in the left direction and displaying an English screen in the right direction. This can be achieved also in such a manner that data processing unit 20 processes each of Japanese screen data and English screen data, and loads respective screen data into right screen data memory 31 and left screen data memory 32. Such a scheme is effectively used, for example, for language learning. If portable phone 100 also attains a function to translate, it is not necessary to store English (or Japanese) screen data in advance. Namely, when the switching operation described above is sensed during display of Japanese in the left direction, the translation function is used to translate the screen currently displayed in the left direction into English, thus creating English screen data and displaying the same in the right direction. Naturally, translation from English to Japanese is also possible. In this manner, the function can be exhibited in language learning.

In the embodiment described above, portable phone 100 has been configured such that dual-view display is realized in two directions of the right direction and the left direction. The direction of display, however, is not limited to these two directions, but portable phone 100 may be configured such that display in N directions where N is 2 or greater, that is, what is called multi-view display, is realized. That is, screen data memory 30 may be configured to include N screen data memories where N is 2 or greater, and data processing unit 20 may be configured such that the screen data generated as a result of division/cut-out processing is loaded into each screen data memory.

In addition, in the embodiment described above, an example in which display on display unit 50 of portable phone 100 is oriented to a plurality of lateral directions has been described. The direction described above, however, is not limited to the lateral direction, and the direction may be set to a longitudinal direction, which is different by exactly 90 degrees from the description above, or may be set to another direction.

Moreover, in the embodiment described above, in portable phone 100, it is assumed that the screen to be displayed is switched in response to the switching operation by utilizing change in the angle of orientation of display unit 50 in the dual-view display mode. The method of switching between the screens, however, is naturally applicable in the single-view display mode. Namely, when the switching operation is detected while the first screen is displayed on display unit 50, portable phone 100 may perform the processing to switch display on display unit 50 to the second screen.

The display method performed in portable phone 100 described above may also be provided as a program. Such a program can be recorded on a computer-readable recording medium such as a flexible disk, a CD-ROM (Compact Disk-Read Only Memory), an ROM, an RAM, and a memory card adapted to a computer, and can be provided as a program product. Alternatively, the program may be recorded and provided in a recording medium such as a hard disk contained in the computer. Further, the program may be provided by downloading through the network.

The provided program product is installed in a program storage unit such as a hard disk for execution. It is noted that the program product includes the program itself and the recording medium recording the program.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The portable display device according to the present invention is advantageously utilized in a portable display device capable of simultaneously displaying different screens in different directions respectively and displaying a large amount of information at a time.

The invention claimed is:

1. A portable display device, comprising:
a screen generation unit generating a first screen and a second screen based on data to be displayed;
a display unit simultaneously displaying screens different from each other in a plurality of display directions corresponding to a plurality of visual points with respect to an identical display screen, respectively; wherein said display unit simultaneously displays said first screen and said second screen in at least two different display directions out of said plurality of display directions, respectively;

a detection unit detecting a display switching operation while the screen of said data to be displayed is displayed on said display unit; and a screen switching unit changing at least one of said screens simultaneously displayed in said different directions, in response to detected said display switching operation, wherein said detection unit detects said display switching operation by sensing change in an angle of said display unit while the screen of said data to be displayed is displayed on said display unit.

2. The portable display device according to claim 1, wherein said screen generation unit cuts out data of a prescribed size based on a possible display size of said display unit from said data to be displayed, so as to generate said first screen, and cuts out data adjacent to said first screen so as to generate said second screen.

3. The portable display device according to claim 1, wherein said screen generation unit cuts out data of a prescribed size based on a possible display size in each said direction of said display unit from said data to be displayed, and divides said cut-out data, so as to generate said first screen and said second screen.

4. The portable display device according to claim 1, wherein said screen generation unit cuts out data of a prescribed size based on a possible display size of said display unit from said data to be displayed, so as to generate said first screen, and generates a screen corresponding to said first screen as said second screen.

5. The portable display device according to claim 1, wherein said display unit displays said first screen and said second screen in said different directions respectively and displays a third screen in all directions simultaneously with said first screen and said second screen.

6. The portable display device according to claim 5, wherein said display unit displays notification of a current display mode of said display unit in said third screen.

7. The portable display device according to claim 1, wherein said display unit displays said first screen substantially in a front direction from said display unit.

8. The portable display device according to claim 1, further comprising a first display mode switching unit switching a display mode on said display unit between a multi-view mode in which said first screen and said second screen are displayed in said different directions respectively and a single-view mode in which one screen is displayed in all directions in an entire display area.

9. The portable display device according to claim 8, wherein said first display mode switching unit switches the display mode on said display unit in accordance with any one of an attribute of said data to be displayed and an application for displaying said data to be displayed.

10. The portable display device according to claim 1, further comprising a second display mode switching unit switching a display mode on said display unit between a multi-view mode in which said first screen and said second screen are displayed in said different directions respectively and a stereoscopic display mode.

11. A portable display device, comprising:

a display unit simultaneously displaying screen data different from each other in a plurality of different display directions; wherein said display unit simultaneously displays first screen data and second screen data in a first display area in at least two different display directions out of said plurality of display directions respectively, and displays one piece of screen data in a second display area different from said first display area such that the screen data can visually be recognized from all directions;

a detection unit detecting a display switching operation while the screen data to be displayed is displayed on said display unit; and a screen switching unit switching between the first screen data displayed and the second screen data displayed on said display unit, in response to detected said display switching operation, wherein said detection unit detects said display switching operation by sensing change in an angle of said display unit while the screen data to be displayed is displayed on said display unit.

* * * * *